United States Patent
Cover

[11] 3,908,472
[45] Sept. 30, 1975

[54] DRIVE MECHANISM

[75] Inventor: Walter E. Cover, Mission Viejo, Calif.

[73] Assignee: Bertea Corporation, Irvine, Calif.

[22] Filed: Sept. 27, 1973

[21] Appl. No.: 401,246

[52] U.S. Cl. .................. 74/25; 137/625.69; 251/33
[51] Int. Cl. ............................................ F16h 21/16
[58] Field of Search.................... 74/25; 251/233; 137/625.69

[56] References Cited
UNITED STATES PATENTS

| 652,495 | 6/1900 | Terry | 251/233 |
| 1,345,496 | 7/1920 | Keeler | 251/233 |
| 1,877,859 | 9/1932 | Hansen | 251/233 |
| 2,669,071 | 2/1954 | St Clair | 251/233 |
| 3,254,660 | 6/1966 | Ray | 251/232 |
| 3,605,561 | 9/1971 | Lado | 137/625.69 |
| 3,727,481 | 4/1973 | Nicholson | 251/233 |

Primary Examiner—Wesley S. Ratliff, Jr.
Attorney, Agent, or Firm—Gordon L. Peterson

[57] ABSTRACT

A drive mechanism comprising a rotary drive member mounted for pivotal movement and a driven member mounted for movement along a path. The driven member has a first surface defining a first cavity opening at the periphery of the driven member, and a second surface defining a second cavity opening into the first cavity. The drive member has a first range of positions in which a section of the drive member is receivable in the second cavity, and a second range of positions in which the section of the drive member is out of the second cavity. In the second range of positions, the drive member cooperates with the first surface to substantially prevent movement of the driven member along the path thereof.

14 Claims, 9 Drawing Figures

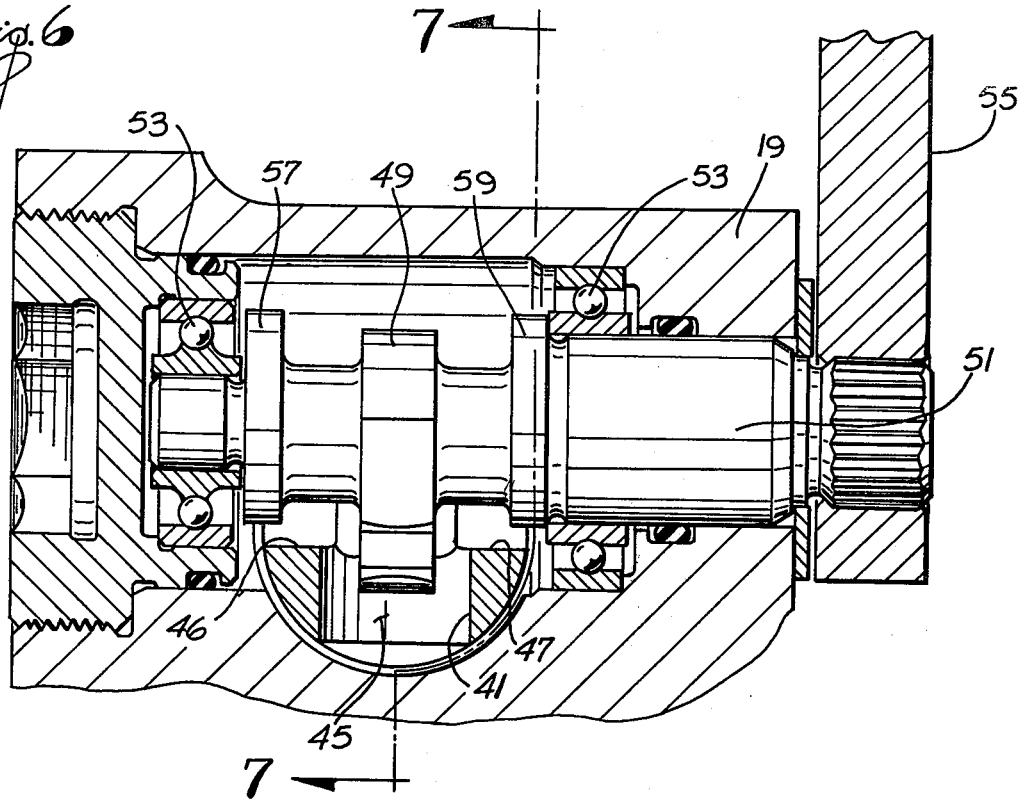
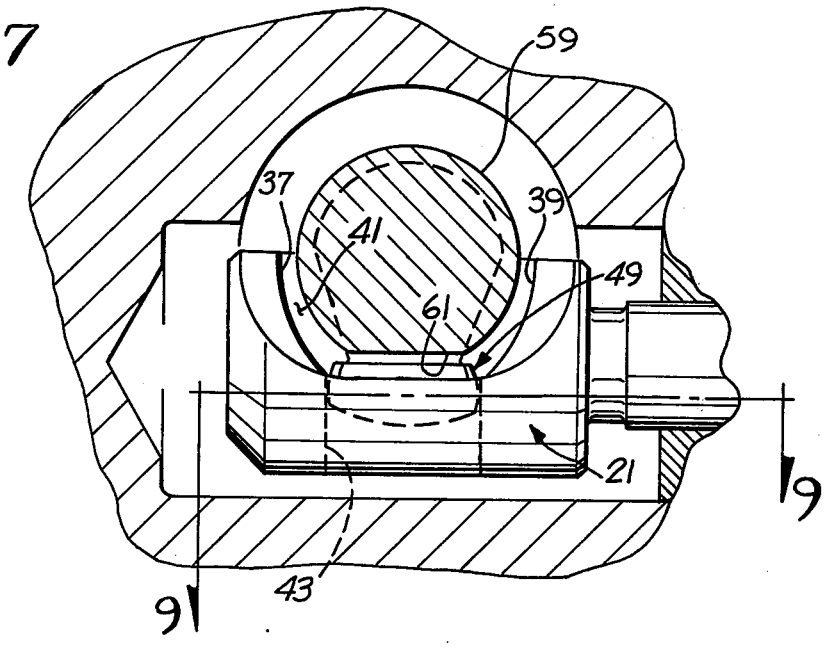

3,908,472

DRIVE MECHANISM

BACKGROUND OF THE INVENTION

Some drive mechanisms employ a rotary drive member and a driven member which is driven along a path by the rotary drive member. The displacement of the driven member along the path is a function of the angular displacement of the rotary drive member. Thus, the greater the angular displacement of the rotary drive member, the greater is the displacement of the driven member along its path.

The driven member must, of course, be disiplaced sufficiently to perform its intended function. In some instances, the driven member is displaced all that is necessary in response to only a relatively small angular displacement of the rotary drive member. Unfortunately, other requirements of the system may make it necessary to rotate the rotary drive member through a much larger angle than is necessary to fully stroke the driven member. This results in additional and unnecessary movement, i.e., overtravel, of the driven member along its path. Overtravel is undesirable because it requires additional space to accommodate the additional movement of the driven member. The mounting structure for the driven member must also be enlarged to accommodate the overtravel. These factors contribute to increased cost of the drive mechanism.

Although overtravel creates problems of a general nature for many different drive mechanisms, these problems are particularly severe in aircraft control systems. For example, the driven element of an aircraft control system may be the valve element of a spool valve. In this event, the spool valve must be made longer and heavier to accommodate overtravel of the valve element. Weight and space penalties are particularly disadvantageous for aircraft.

SUMMARY OF THE INVENTION

The present invention provides a drive mechanism which moves the driven member through the minimum distance necessary for the driven member to accomplish its function. After the driven member is fully displaced, additional angular displacement of the rotary drive member does not result in displacement of the driven member along its path.

A conventional cam having dwell is not as suitable for the rotary drive member because cams are more difficult to make. A device of the type shown in U.S. Pat. No. 3,512,422 is also not suitable, because the driven member of the patented construction is not under the full control of the rotary drive member in that a spring return is utilized.

With the present invention, the rotary drive member fully controls the driven member so that the driven member cannot move in either direction along its path except in response to appropriate angular displacement of the rotary drive member. This can advantageously be accomplished by appropriately configuring cooperating surfaces of the rotary drive member and the driven member.

More particularly, the driven member includes first surface means defining a first cavity opening at the periphery of the driven member, and second surface means defining a second cavity opening into the first cavity. The rotary drive member has a first range of positions in which a section of the drive member is received in the second cavity and cooperatively engages the surface defining this cavity to displace the driven member along its path. The rotary drive member has a second range of positions in which the rotary drive member is received in the first cavity and cooperates with the first surface means to substantially prevent the movement of the driven member along its path.

The construction thus described vaguely resembles the so-called ball-in-a-hole type of control which is a conventional control mechanism for certain hydraulic control components. However, in this conventional mechanism, the ball is always held in cooperative engagement with the surface defining the hole in which it is positioned. In addition, this conventional mechanism does not provide for rotary movement of the rotary drive member while the driven member is held stationary.

With the present invention the rotary drive member is operative to drive the driven member so long as it cooperatively engages the surface defining the second cavity, i.e., in the first range of positions. After rotating through a predetermined arc, the rotary drive member automatically terminates its cooperative engagement with the surface defining the inner cavity. In the second range of positions, angular displacement of the rotary drive member will not impart movement to the driven member. Moreover, the driven member cooperates with the surface defining the first cavity to substantially prevent movement of the driven member along its path. Thus the driven member is completely controlled by the rotary drive member, and no spring return is necessary.

In a broader sense the present invention embraces the concept of driving the driven member at a first rate in the first range of positions, and at a second rate when the drive member is in the second range of positions. A characteristic of these rates is different. Either of the rates may be linear or nonlinear. In a preferred embodiment, the rate is zero in the second range of positions.

It is also possible to drive the drive mechanism in reverse. In this event, the driven member becomes the driving member. If this is done, the rotary member may not be drivable out of the second range of positions, depending upon the specific construction of the cooperating surfaces. In this event, the rotary member provides an interlock which would have to be reset in order to get it out of the second range of positions.

A driven member such as the valve element of a spool valve can rotate with respect to its housing. Such rotational movement is undesirable. With the present invention the rotary drive member cooperates with the driven member to prevent this unwanted rotation.

Although the present invention is applicable to drive mechanisms generally, it is particularly adapted for use in positioning an element of a hydraulic control system such as a summing lever or spool valve.

The invention can best be understood by reference to the following description taken in conjunction with the accompanying illustrative drawings.

BRIEF DESCRIPTION OF THE DRAWINGS

In FIG. 3 the background structure has been removed for clarity.

FIG. 6 is an enlarged, fragmentary, sectional view taken generally along line 6—6 of FIG. 1 with the rotary drive member in the neutral position.

FIG. 7 is a sectional view taken generally along line 7—7 of FIG. 6, with the rotary drive member in the neutral position.

DESCRIPTION OF THE PREFERRED EMBODIMENTS

Figure 1:
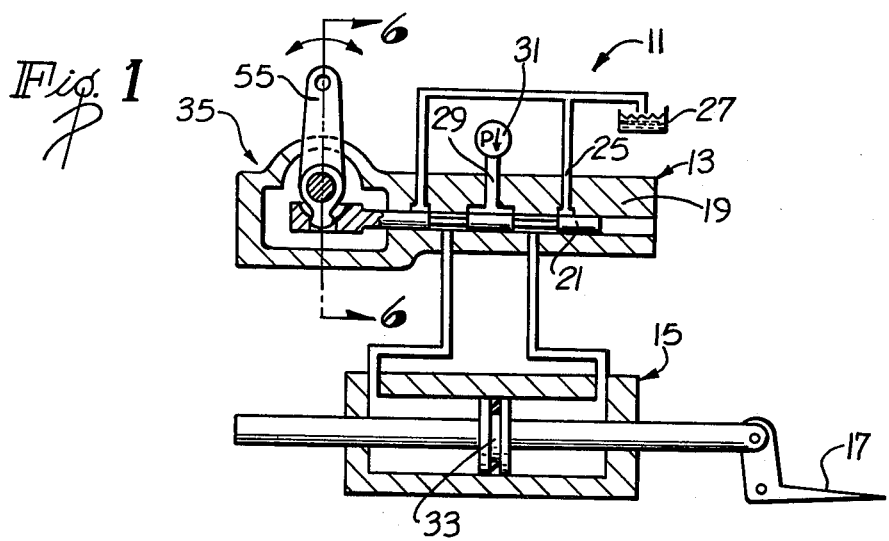
FIG. 1 is a schematic sectional view of an aircraft control system constructed in accordance with the teachings of this invention.

FIG. 1 shows an aircraft control system 11 having the drive mechanism of this invention incorporated therein. It should be understood however that the drive mechanism of this invention has other applications.

Figure 3:
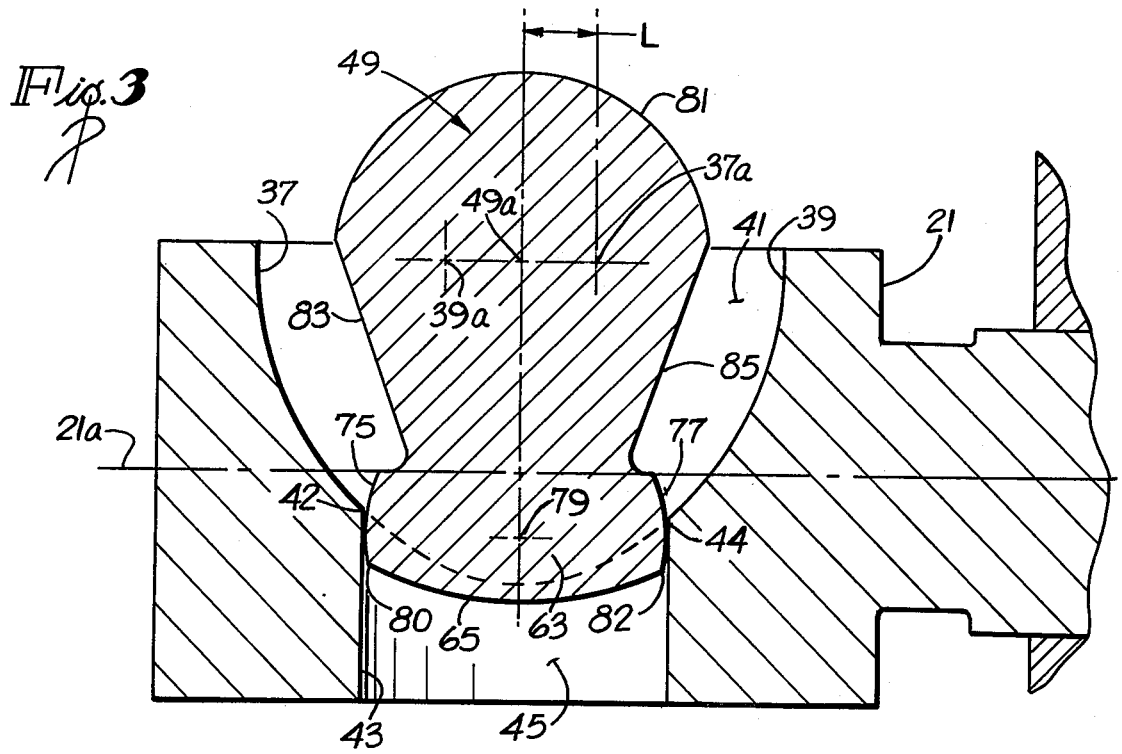
FIG. 3 is an enlarged, fragmentary, sectional view taken generally on line 3—3 of FIG. 8 and showing the rotary drive member and the valve element with the rotary drive member being in a central driving position.

The control system 11 shown by way of example in FIG. 1 includes a valve 13 and an actuator 15 for controlling the angular position of an aircraft flight control surface 17. The valve 13 includes a valve housing 19 and a valve element 21 mounted for axial sliding movement in the housing along a rectilinear path. The valve element has a central axis 21a (FIG. 3). The housing 19 has return ports 23 and 25 communicating with a return reservoir 27 and a supply port 29 communicating with a source 31 of hydraulic fluid under pressure.

The actuator 15 includes a piston 33. The valve element 21 has a series of lands and grooves which are responsive to valve element position to control the flow of hydraulic fluid to and from the actuator 15 in a conventional manner. In FIG. 1 the valve element 21 is in a neutral position and blocks all fluid flow to and from the actuator 15. By moving the valve element 21 to the right from the position shown in FIG. 1, fluid at supply pressure is admitted to the left face of the piston 33, and the right face of the piston 33 is placed in communication with the return reservoir 27. Accordingly, the piston 33 moves to the right to adjust the angular position of the control surface 17. Obviously, by moving the valve element 21 to the left of the neutral position, the piston 33 is also moved to the left.

A drive mechanism 35 constructed in accordance with the teachings of this invention is employed to control the position of the valve element 21. Conventional feedback connections (not shown) from the actuator 15 may also be utilized to assist in controlling the valve element 21. The details of the drive mechanism 35 can best be understood by reference to FIGS. 6–9. The valve element 21 has a segment with arcuate surface portions 37 and 39 defining an outer cavity 41 which opens at the periphery of the valve element 21. In the embodiment illustrated, each of the arcuate surface portions 37 and 39 forms a portion of a cylinder having identical radii and having parallel axes extending transverse to the axis 21a of the valve element 21.

The valve element 21 also has a cylindrical surface 43 which defines a cavity 45 which opens into the cavity 41 and at the lower periphery of the valve element 21. The axis of the cylindrical surface 43 is perpendicular to the axis 21a of the valve element 21, and transverse to the axes of the cylindrical surfaces 37 and 39. The surface 45 intersects the surfaces 37 and 39 at the edges 42 and 44, respectively (FIG. 3).

The valve element 21 also has identical anti-rotation surfaces 46 and 47 on the opposite sides of the cavity 41. Although each of the surfaces 46 and 47 may be planar, in the embodiment illustrated, each of these surfaces includes a flat planar central portion and arcuate opposite end portions. The cavity 41 opens upwardly and laterally outwardly as viewed in FIG. 7.

The valve element 21 is positioned by a rotary drive member 49 in the form of a crank. As best seen in FIG. 6, the drive member 49 is mounted for rotation about a pivotal axis 49a by a shaft 51. The opposite ends of the shaft 51 are rotatably mounted by bearings 53. The bearings 53 in turn are mounted in the housing 19. The shaft 51 can be angularly displaced by a lever 55 which is suitably affixed to one end of the shaft. The lever 55 can be driven manually or by a suitable control apparatus (not shown).

A pair of anti-rotation flanges 57 and 59 are mounted on, and integral with, the shaft 51 on opposite sides of the rotary drive member 49. The anti-rotation flanges 57 and 59 are identical and concentrically arranged on the shaft 51. Each of these flanges is substantially cylindrical, except for a flat surface 61 on each of the flanges. The surfaces 61 are identically oriented and can be of various different configurations.

The details of the drive member 49 and the portion of the valve element 21 which cooperates therewith can best be seen in FIG. 3. The cylindrical surface portions 37 and 39 have center lines 37a and 39a, respectively. The center lines 37a and 39a are parallel and define a plane which is parallel to the axis 21a of the valve element 21. The center lines 37a and 39a lie on opposite sides of the axis of the cavity 45. The axis 49a coincides with the center line of the shaft 51. The axis 49a is parallel to, and lies in the same plane as, the center lines 37a and 39a. In the central driving position shown in FIG. 3, the axis 49a lies halfway between the center lines 37a and 39a.

The drive member 49 has a lower section 63 which is adapted to be received in the cavity 45 in the central driving position shown in FIG. 3. The drive member 49 has a peripheral surface portion 65. In the embodiment illustrated, the peripheral surface portion 65 is cylindrical and has a center line which coincides with the axis 49a. The radii of the surface portions 37, 39, and 65 are substantially equal.

The section 63 has identical spherical end surfaces 75 and 77 having a common center 79 which lies below the axis 21a. The end surfaces 75 and 77 could be of other configurations such as cylindrical, if desired, provided that the shape of the surface 45 is appropriately modified. The end surfaces 75 and 77 are slidably received within the cavity 45 with only a very small clearance. The end surfaces 75 and 77 intersect along edges 80 and 82, respectively.

The drive member 49 has a peripheral surface portion 81 generally opposite to the peripheral surface portion 65. The peripheral surface portion 81, in the embodiment illustrated, is cylindrical and has a center line which coincides with the axis 49a. The radius of the peripheral surface portion 81 is less than the radius of the peripheral surface portion 65. Peripheral surface portions 83 and 85 join the opposite ends of the peripheral surface portion 81 to the end surfaces 75 and 77, respectively. The drive member 49 does not completely fill the cavity 45 (FIG. 9) in that it has planar parallel side faces 87.

Figure 4:
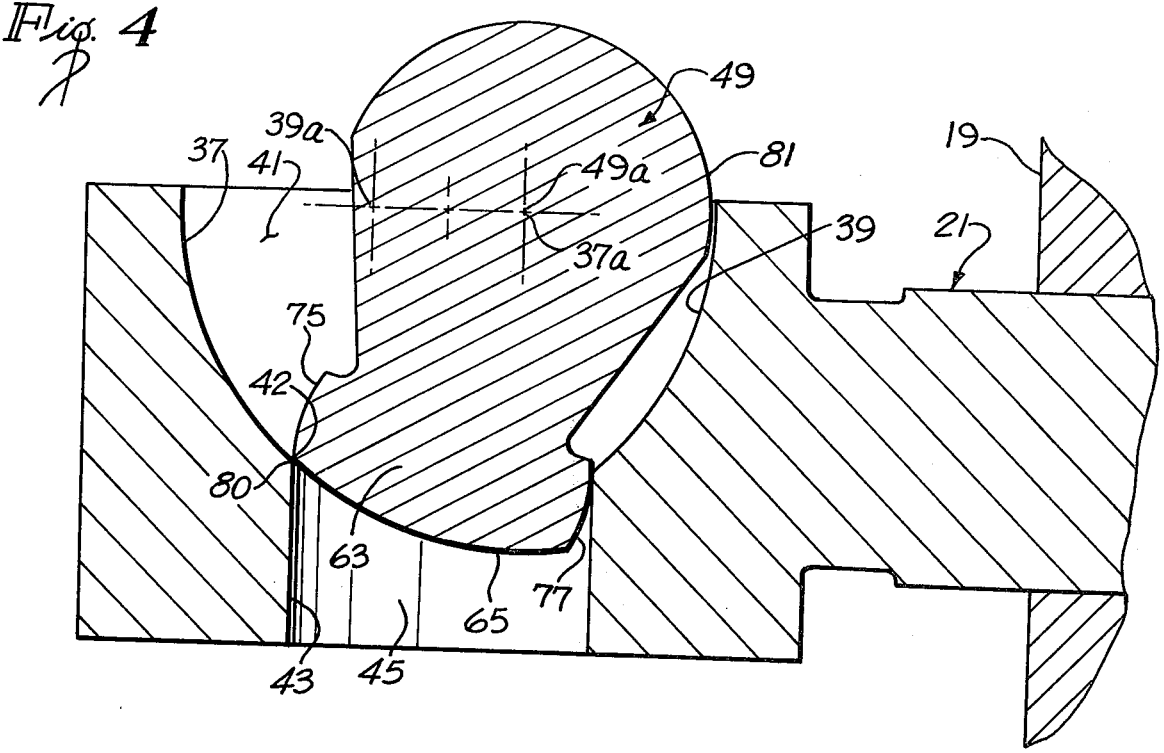
FIG. 4 is a view similar to FIG. 3, with the rotary drive member at a transition position.
Figure 5:
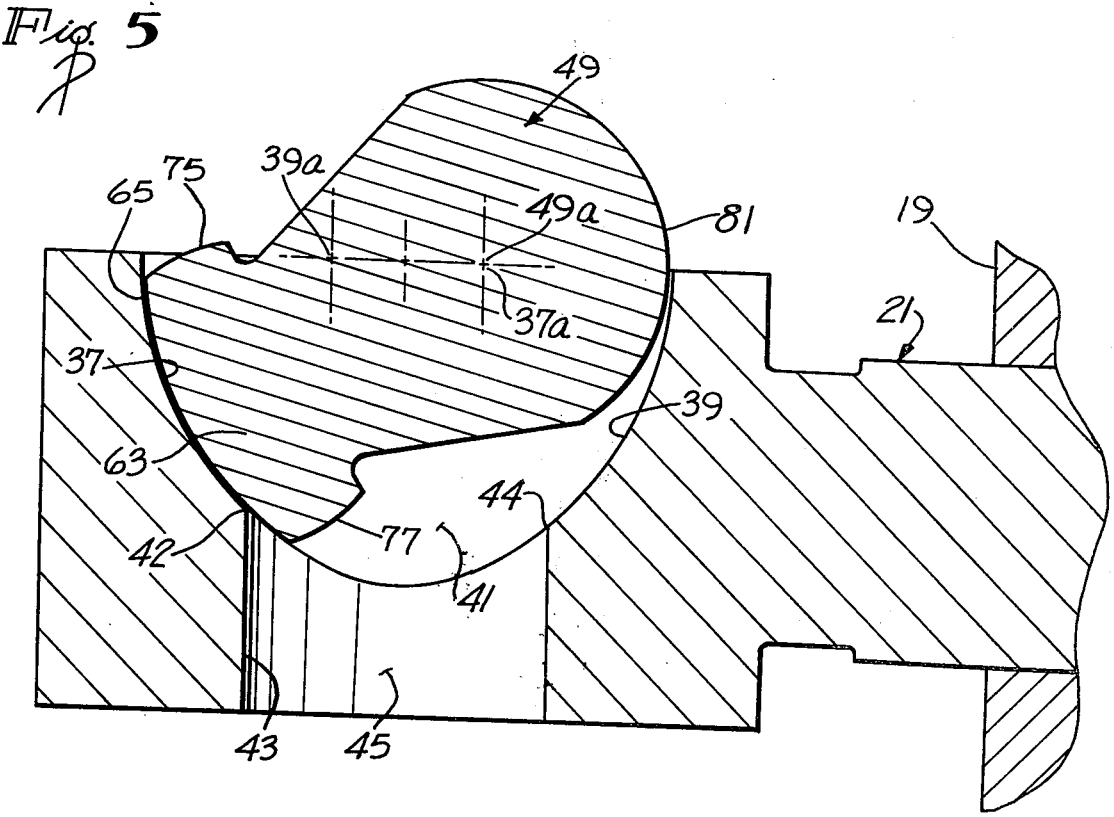
FIG. 5 is a sectional view similar to FIG. 3, with the rotary drive member in the second range of positions.
Figure 8:
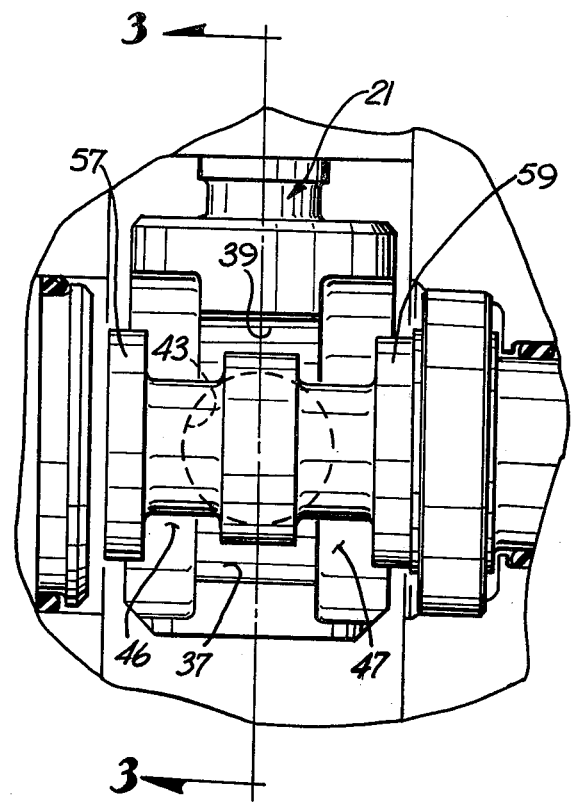
FIG. 8 is a fragmentary plan view of the rotary drive member and the driven member.
Figure 9:
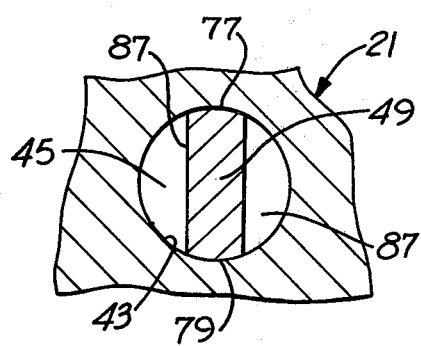
FIG. 9 is a fragmentary, sectional view taken generally along line 9—9 of FIG. 7.

The operation of the drive mechanism 35 can best be understood from FIGS. 3–5. In the central driving position shown in FIG. 3, the section 63 is received within the cavity 45. The end surfaces 75 and 77 engage or are very closely adjacent opposite portions of the surface 43. In the central driving position the drive member 49 can displace the valve element 21 an equal distance in either direction. In addition, the axis 49a is equidistant from the center lines 37a and 39a. Although other arrangements could be employed, in the embodiment illustrated, the valve element 21 is in the neutral position shown in FIG. 1 when the drive mechanism 35 is in the central driving position.

To move the valve element 21 to the left as viewed in FIGS. 3–5, the drive member 49 is rotated about its pivot axis 49a in a clockwise direction. This causes the end surface 75 to bear against the cylindrical surface 43 and move the valve element 21 to the left. As clockwise movement of the drive member 49 continues, the end surface 75 slides upwardly along the surface 43.

Ultimately a transition position is reached in which the lower edge 80 of the end surface 75 contacts the edge 42 of the valve element 21. The transition position, which is shown in FIG. 4, marks the end of cooperative engagement between the end surface 75 and the cylindrical surface 43. If the drive member 49 is rotated clockwise from the position of FIG. 4 to the position of FIG. 5, no further rectilinear movement of the valve element 21 will occur. In the transition position shown in FIG. 4, the peripheral surface portion 81 lies partially within the cavity 41 and confronts the surface portion 39. In the transition position, the valve element 21 cannot be moved further to the left by external forces because of the engagement or substantial engagement between the end surface 77 and the cylindrical surface 43, and between the peripheral surface portion 81 and the surface portion 39. The edges 42 and 80 engage to prevent external forces from moving the valve element 21 to the right of the position shown in FIG. 4. In the central driving position and all positions intermediate the central driving position and the transition position, i.e., in the first range of positions, the engagement of the end surfaces 75 and 77 with the cylindrical surface 43 prevents external forces from moving the valve element 21 along its path.

As the valve element 21 is moved from the central driving position of FIG. 3 to the transition position of FIG. 4, the axis 49a of the drive member 49 remains stationary. The centers 37a and 39a are moved to the left a distance L (FIG. 3) which equals half the distance between these center lines. Thus at the transition position, the center line 37a coincides with the axis 49a of the drive member 49.

The drive member 49 has a second range of positions which is displaced clockwise from the transition position of FIG. 4. One of the positions in the second range of positions is shown in FIG. 5. The valve element 21 undergoes no displacement as the drive member 49 is angularly displaced from the transition position of FIG. 4 to the position of FIG. 5. The reason for this is that the centers of the peripheral surface portion 65 and the surface portion 37 coincide with each other and with the axis of rotation of the drive member 49.

In the second range of positions, the peripheral surface portion 65 engages the arcuate surface portion 37 to prevent external forces from moving the valve element 21 to the right as viewed in FIG. 5. Similarly, the peripheral surface portion 81 engages or nearly engages the surface portion 39 to prevent external forces from moving the valve element to the left as viewed in FIG. 5. In the second range of positions, the section 63 is effectively lifted out of the cavity 45.

With reference to FIG. 1, the rectilinear displacement of the valve element 21 as a result of moving the drive member 49 from the central driving position of FIG. 3 to the transition position of FIG. 4 is sufficient to fully operate or stroke the valve element. No additional rectilinear movement of the valve element 21 is necessary or desired. However, the input to the drive member 49 is allowed to rotate the drive member through a greater arc, as shown by way of example in FIG. 5. During all positions of the drive member 49 the valve element 21 is under the full control of the drive member 49 and cannot be moved by external forces.

If the drive member 49 is rotated counterclockwise from the position shown in FIG. 5, no movement of the valve element 21 along its path will occur until the end surface 77 engages the cylindrical surface 43 at the transition position. Further counterclockwise movement of the drive member 49 from the transition position of FIG. 4 results in movement of the valve element 21 to the right. The drive member 49 may be rotated counterclockwise through the central driving position of FIG. 3 to a transition position which defines the extreme righthand end of the stroke of the valve element 21. This transition position corresponds to the transition position of FIG. 4, except that the lower edge 82 of the end surface 77 engages the edge 44. Additional counterclockwise movement of the drive member 49 into the second range of positions on the righthand side of neutral results in no further displacement of the valve element 21. Thus the operation of the drive mechanism 35 is the same whether the drive member 49 is displaced clockwise or counterclockwise from the central driving position.

Figure 2:
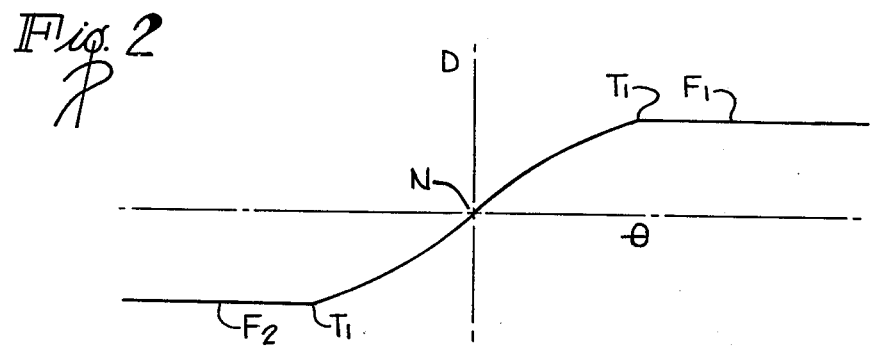
FIG. 2 is a plot of displacement of the driven member versus angular displacement of the rotary drive member.

FIG. 2 is a plot of displacement D of the valve element 21 versus angular displacement $\theta$ of the drive member 49. The intersection of the axes of the graph in FIG. 2 represents the central driving position N of FIG. 3. The points $T_1$ and $T_2$ represent the transition positions resulting from clockwise and counterclockwise displacement of the drive member 49. The portion of the curve between $T_1$ and $T_2$ represents the first range of positions. The portion of the curve between $T_1$ and $T_2$ is nearly linear, and has a variable slope other than zero, thereby representing displacement of the valve element. The shape of the curve between $T_1$ and $T_2$ can be varied by changing the geometry of the drive mechanism 35. The curve between the points N and $T_1$ is identical to the curve between the points N and $T_2$; however, these two curves need not be identical.

The curve shown in FIG. 2 also has flat or linear portions $F_1$ and $F_2$ representing the second range of positions. The portions $F_1$ and $F_2$ have a zero slope, thereby indicating no displacement of the valve element 21.

The curve of FIG. 2 is merely illustrative of one preferred relationship between $\theta$ and D. This curve can be tailored to suit particular requirements by appropriately shaping and dimensioning the drive mechanism 35. For example, the flat portion $F_1$ could have a slope other than zero and be curved rather than linear, if desired. Although D represents rectilinear motion in the embodiment illustrated, the driven member can be angularly displaced by the rotary drive member 49.

It should be undersstood that the drive mechhanism 35 could be operated in reverse, in which event the element 21 becomes the driver and the member 49 becomes the driven member. In this event, if the member 49 were moved slightly into the second range of positions by the element 21, it would serve as an interlock to prevent further movement of the element 21. The mechanism would then have to be reset by moving the member 49 directly back into the range of angles between the points $T_1$ and $T_2$.

The valve element 21 is slidably mounted in the housing 19 and can rotate about its axis unless means are provided to prevent such rotation. So long as the section 63 is within the cavity 45, it cooperates with the surface 43 to prevent such rotation. However, in the second range of positions, the section 63 can no longer prevent rotation of the valve element 21 about its axis. However, rotation of the valve element 21 is substantially prevented under these circumstances by the anti-rotation flanges 57 and 59 (FIG. 6) which are engageable with the anti-rotation surfaces 46 and 47, respectively. The spacing between the anti-rotation flanges 57 and 59 and the associated anti-rotation surfaces 46 and 47 can be selected to correspond to the maximum amount of angular rotation of the valve element 21 which is permitted.

The angle through which the rotary drive member turns in moving from the central driving position to the transition position is about 16° in the embodiment illustrated, but this angle can be widely varied depending upon the results desired. Similarly, the angle through which the rotary drive member turns in moving from the central driving position to the outer limit of the second range of positions is about 90° in the embodiment illustrated, but this angle can be widely varied depending upon the results desired.

Although exemplary embodiments of this invention have been shown and described, many changes, modifications and substitutions may be made by those having ordinary skill in the art without necessarily departing from the spirit and scope of this invention.

I claim:

1. A drive mechanism comprising:
    a first member;
    means for mounting said first member for movement along a first path;
    a second member;
    means for mounting said second member for movement along a second path;
    first surface means defining a first cavity in said second member;
    second surface means defining a second cavity in said second member, said second cavity opening into said first cavity;
    said first member having a first range of positions in which a section of said first member is receivable in said second cavity and a second range of positions in which at least a portion of said first member is received in said first cavity;
    said section of said first member being cooperable with said second surface means to provide a driving connection between said members in said first range of positions whereby one of said members can drive the other of said members;
    said first surface means being cooperable with said first member to substantially prevent movement of said second member along the path thereof in said second range of positions; and
    at least one of said paths being arcuate.

2. A drive mechanism comprising:
    a drive member;
    means for mounting said drive member for pivotal movement;
    a driven member;
    means for mounting said driven member for movement along a path;
    first surface means defining a first cavity in said driven member;
    second surface means defining a second cavity in said driven member, said second cavity opening into said first cavity, said first cavity opening at the periphery of the driven member;
    said drive member being at least partially receivable in said cavities, said drive member having a first range of positions in which a section of said drive member is receivable in said second cavity and a second range of positions in which at least a portion of said drive member is received in said first cavity;
    said section of said drive member being cooperable with said second surface means whereby said drive member can drive said driven member at a first rate along said path in response to pivotal movement of said drive member in said first range of positions;
    said section of said drive member being cooperable with said first surface means to drive said driven member at a second rate along said path in response to pivotal movement of said drive member in said second range of positions;
    each of said rates being defined as the distance traveled by said driven member per degree of pivotal movement of said drive member, a characteristic of each of said rates being different; and
    said first surface means being slidably cooperable with said drive member to allow said drive member to control the position of said driven member along said path in said second range of positions and to substantially prevent movement of the driven member independently of the drive member in the second range of positions.

3. A drive mechanism as defined in claim 2 wherein said second rate is substantially zero.

4. A drive mechanism as defined in claim 2 wherein said path is substantially rectilinear.

5. A drive mechanism as defined in claim 2 wherein said driven member has an axis, said drive mechanism including means on said drive member for preventing rotation of said driven member about its axis when said drive member is in said second range of positions.

6. A drive mechanism as defined in claim 2 wherein said drive member has first and second peripheral surface portions which are engageable with said first surface means in said second range of positions to substantially hold said driven member against movement along said path.

7. A drive mechanism as defined in claim 2 wherein the drive member has a pivot axis, said first surface means includes a first surface region which defines a part circular arc as viewed in cross section in a plane generally perpendicular to said pivot axis, said section of said drive member having a first peripheral surface portion which is part circular as viewed in cross section on said plane, the radii of said part circular arcs being substantially equal.

8. A drive mechanism as defined in claim 7 wherein said first surface means includes a second surface region which defines a part circular arc as viewed in cross section in said plane, said first and second surface regions being on opposite sides of said drive member when said drive member is in said first range of positions, said second surface region having a radius substantially equal to the radius of said first surface region.

9. A drive mechanism as defined in claim 8 wherein said drive member has a second peripheral surface portion genenrally opposite said first peripheral surface portion, said second peripheral surface portion defining a part circular arc as viewed in cross section in said plane, the radius of said last-mentioned part circular arc being less than the radius of said first peripheral surface portion, at least a portion of said second peripheral surface portion being receivable in said first cavity in said second range of positions.

10. A valve comprising:
a valve housing having a plurality of ports therein;
a valve element slidable in said housing along a path between a first position in which said valve is in a first state and a second position in which said valve is in a second state, the output of the valve in said first state being different from the output of said valve in said second state;
said valve element including a segment having first and second surfaces of different configurations;
a rotary drive member;
means for mounting said rotary drive member for rotation about an axis extending generally transverse to said path, said rotary drive member being rotatable through a first range of positions and a second range of positions;
a section of said rotary drive member being cooperable with said first surface in said first range of positions to drive said valve element between said first and second positions;
said rotary drive member being cooperable with said second surface in said second range of positions to hold said valve element substantially against movement along said path while allowing rotary movement of said rotary drive member; and
said first and second range of positions being different.

11. A valve as defined in claim 10 wherein said first surface defines a first cavity opening at the periphery of said segment and said second surface defines a second cavity opening into said first cavity, said rotary drive member being at least partially receivable in said cavities.

12. A valve as defined in claim 10 wherein said valve element is rotatable about its axis relative to said housing, said valve includes a stop on said segment and an abutment carried by said means, said stop being engageable with said abutment to substantially prevent rotation of said valve element when said rotary drive member is in said second range of positions.

13. A valve as defined in claim 10 wherein said first surface defines a first cavity opening at the periphery of said segment, and said second surface defines a second cavity opening into said first cavity, said rotary drive member including a section receivable in said second cavity in said first range of positions, said section of said rotary drive member being substantially out of cooperative engagement with said second surface in said second range of positions, said section of said rotary drive member having an arcuate surface with a radius of predetermined length, said first surface including an arcuate surface having a radius of substantially said predetermined length, said arcuate surfaces being in substantial engagement in said second range of positions.

14. A valve as defined in claim 13 wherein said section of said rotary drive member has end surfaces which are receivable within said second cavity to retain said valve element in position in said first range of positions and said rotary drive member has a peripheral surface region generally opposite said arcuate surface of said rotary drive member, said peripheral surface region being closely adjacent said first surface in said second range of positions.

* * * * *